Nov. 8, 1927.

E. DEITENBECK

TIRE

Filed March 19, 1927

Inventor:
Ernst Deitenbeck by [signature]
Atty.

Nov. 8, 1927.

E. DEITENBECK 1,648,218

TIRE

Filed March 19, 1927

Patented Nov. 8, 1927.

1,648,218

UNITED STATES PATENT OFFICE.

ERNST DEITENBECK, OF BERLIN, GERMANY.

TIRE.

Application filed March 19, 1927. Serial No. 176,713, and in Germany June 28, 1924.

My invention relates to built-up tires for the wheels of vehicles such as motor bicycles, motor cars and the like. It is an object of my invention to provide a particularly efficient tire of this kind.

In accordance with my invention I arrange two concentric rings of substantially U-shaped section, that is, of a section comprising a web and two flanges, with their webs facing each other so that the flanges of the outer ring extend toward the outside and the flanges of the inner ring toward the inside of the wheel. The two rings are enclosed in a casing of resilient material, preferably after having been connected by a wrapping of cord, rope or other flexible material, the casing being preferably made of rubber vulcanized onto the wrapper.

In a preferred embodiment of my invention the tire is placed on the outer edge of an annular support in the wheel body so that the flanges of the inner ring straddle the annular support and the tire is carried on the resilient intermediate portion between the flanges. Similarly, the tread of the tire is narrower than the clearance between the flanges of the outer ring so that its base is also supported on the resilient intermediate portion between the flanges of the outer ring.

In the drawings affixed to this specification and forming part thereof a tire embodying my invention is illustrated diagrammatically by way of example.

In the drawings

Figure 3:
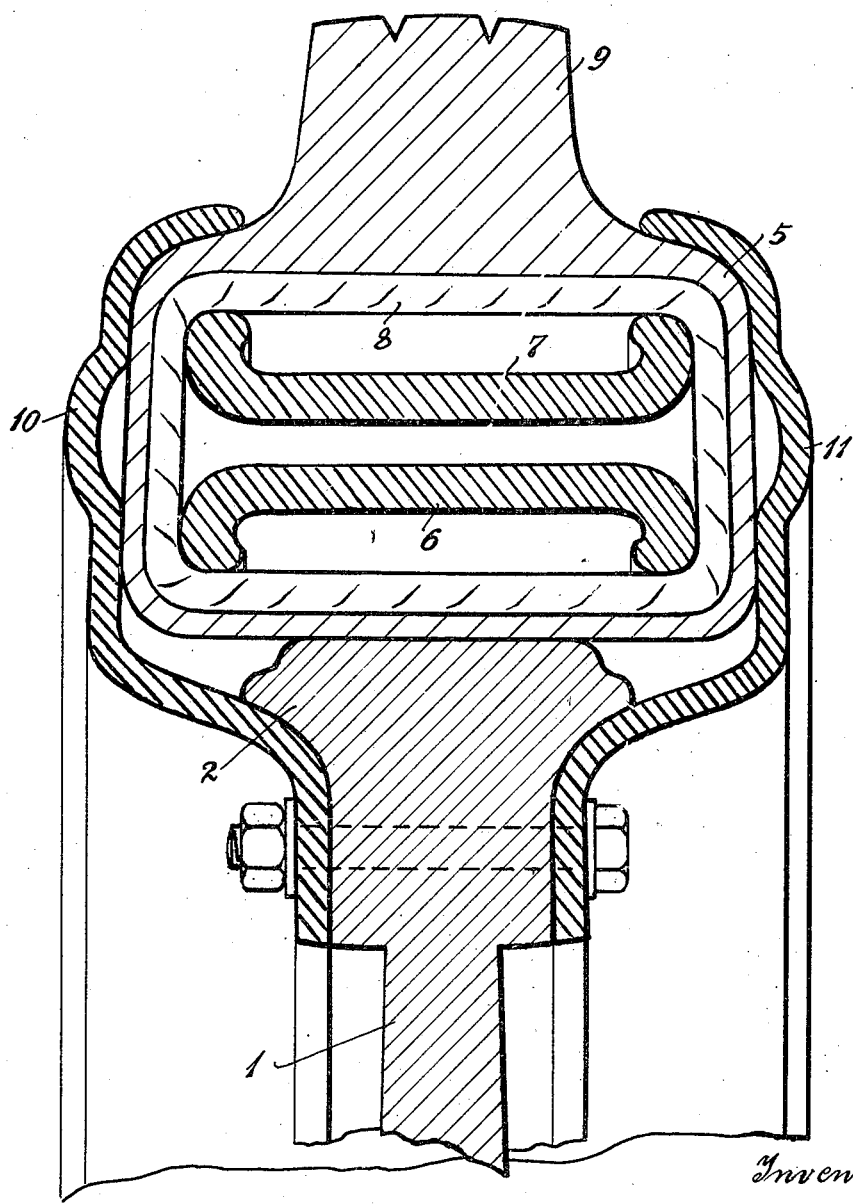

These figures illustrate a tire which is without a support against transverse deflection, and Fig. 3 is a transverse section, on a larger scale of a modified tire which is held by lateral supports on the wheel body.

Figure 1:
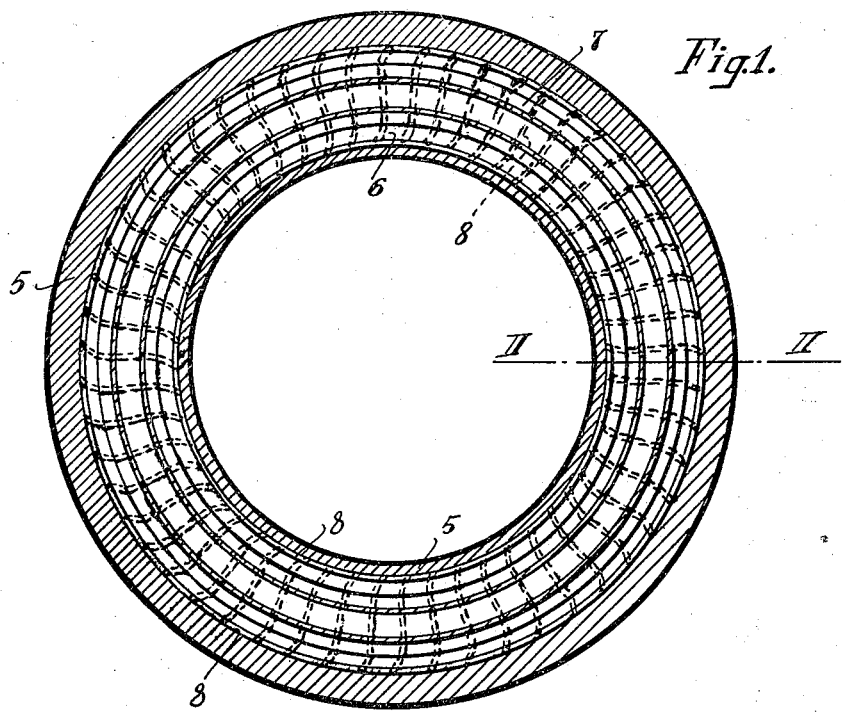
Fig. 1 is a section of a tire in central plane of a tire.
Figure 2:
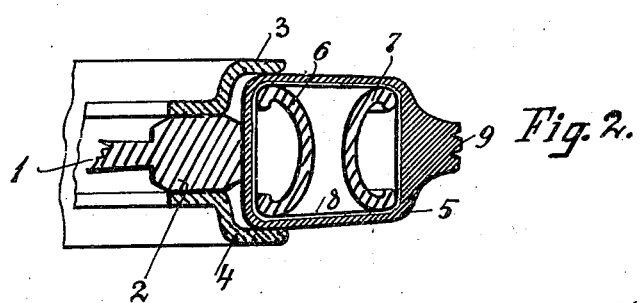
Fig. 2 is a section on the line II—II in Fig. 1 with the tire mounting also shown.

Referring to the drawings; and first to Figs. 1 and 2, 1 is the body of the wheel which may be designed in any suitable manner and in the present instance is equipped with a central annulus 2 and two annular flanges 3 and 4 on each side of the annulus. These parts are not illustrated in Fig. 1 which merely shows a section of the tire. The tire 5 is built up from two concentric rings 6 and 7 of channel-section. In the example illustrated the section resembles the letter C. The rings are connected by a wrapper 8 of some suitable flexible material, for instance cord, rope, belting or the like which is wound about them as indicated by the dotted curves in Fig. 1. The body of the tire 5 is formed by vulcanizing rubber onto the wrapper, and a tread 9 may be made to surround the body of the tire in the usual manner.

With the flanges of the rings 6 and 7 straddling the faces of the annulus 2 and the tread 9, the tire is supported on the body of the wheel not by the comparatively rigid inner ring 6 but by the reach of resilient material intermediate the flanges of the inner ring. Similarly shocks acting on the tread 9 are absorbed substantially by the resilient material intermediate the flanges of the outer ring 7. At the same time, however, the rings are able to yield to some extent so that they partake in the absorption of comparatively severe shocks and assist in damping them out before they are transmitted to the body of the wheel.

Where a more rigid construction is desired the flanges 3 and 4 are extended as shown at 10 and 11 in Fig. 3 so that they afford a lateral support to the tire 5 and only the tread 9 projects from the ends of the flanges 10, 11. As in this instance it is not desirable that the radial dimension of the tire body should be large, as the flanges 10, 11 would become too long, the rings 6 and 7 are substantially cylindrical so that the radial thickness of the ring structure is reduced as compared with the curved sections in Fig. 2. It will appear, however, that their operation will be exactly the same as the ring structure is connected with the annulus 2 and the tread 9 of the tire only intermediate the flanges of the rings 6 and 7.

Instead of vulcanizing the tire directly onto the wrapper of the rings, as shown and described, a separate tread may be provided. The tire can be removed or exchanged after removal of one of the flanges 3, 4 or 10, 11, respectively.

By providing flanges extending substantially all over the body of the tire 5, as shown in Fig. 3, the tire is protected against damage, also from projectiles, so that it is also suitable for vehicles serving military purposes, tanks and the like.

I wish it to be understood that I do not desire to be limited to the exact details of construction shown and described for obvious modifications will occur to a person skilled in the art.

I claim:—

1. Tire comprising two concentric rings of channel-section, one disposed within and spaced from the other with the webs of the channels facing each other and the flanges of the inner ring extending inwards, the flanges of the outer ring outwards, a wrapper of flexible material surrounding said rings, and a rubber casing vulcanized onto, and surrounding said wrapper.

2. Tire comprising two concentric rings of channel-section, one disposed within and spaced from the other with the webs of the channels facing each other and the flanges of the inner ring extending inwards, the flanges of the outer ring outwards, a rubber casing surrounding said rings, and a tread formed on said casing.

3. A tire comprising a resilient casing and a pair of substantially rigid rings secured against relative displacement in non-resilient manner, so as to constitute an independent and substantially rigid unit in said resilient casing.

4. A wheel having a tire comprising a resilient casing, a pair of substantially rigid rings secured against relative displacement in non-resilient manner, so as to constitute an independent and substantially rigid unit in said resilient casing, and lateral flanges extending beyond the point where said tire is supported on said wheel and engaging said tire on either side with substantially flat faces.

5. A wheel having a tire comprising a resilient casing, a pair of substantially rigid rings secured against relative displacement in non-resilient manner, so as to constitute an independent and substantially rigid unit in said resilient casing, lateral flanges extending beyond the point where said tire is supported on said wheel and engaging said tire on either side with substantially flat faces, and extensions projecting inwardly from said flanges so as to restrain said casing between them.

In testimony whereof I affix my signature.

ERNST DEITENBECK.